United States Patent
Lu et al.

(10) Patent No.: US 9,902,646 B2
(45) Date of Patent: Feb. 27, 2018

(54) LEAD-FREE SEALING GLASS AND MANUFACTURE METHOD THEREOF

(71) Applicants: BOE TECHNOLOGY GROUP CO., LTD., Beijing (CN); K-TRONICS (SUZHOU) TECHNOLOGY CO., LTD., Suzhou, Jiangsu Province (CN)

(72) Inventors: Kejun Lu, Beijing (CN); Guobin Qin, Beijing (CN)

(73) Assignees: BOE TECHNOLOGY GROUP CO., LTD., Beijing (CN); K-TRONICS (SUZHOU) TECHNOLOGY CO., LTD., Suzhou, Jiangsu Province (CN)

(*) Notice: Subject to any disclaimer, the term of this patent is extended or adjusted under 35 U.S.C. 154(b) by 50 days.

(21) Appl. No.: 15/094,165

(22) Filed: Apr. 8, 2016

(65) Prior Publication Data

US 2017/0001904 A1    Jan. 5, 2017

(30) Foreign Application Priority Data

Jul. 1, 2015 (CN) .......................... 2015 1 0379833

(51) Int. Cl.
*C03C 8/02* (2006.01)

(52) U.S. Cl.
CPC .......... *C03C 8/02* (2013.01); *C03C 2205/00* (2013.01)

(58) Field of Classification Search
CPC .......... C03C 3/062; C03C 3/064; C03C 3/087; C03C 8/00; C03C 8/02; C03C 8/24
See application file for complete search history.

(56) References Cited

FOREIGN PATENT DOCUMENTS

| CN | 102050577 A | 6/2011 |
|---|---|---|
| CN | 102190443 A | 9/2011 |
| WO | 2005/000755 A1 | 1/2005 |

OTHER PUBLICATIONS

Chengyu Wang, et al; "Design and Adjustment for Glass Components", Chemical Industry Press Material Science and Engineering Press Center Beijing, 7 pages published Jan. 31, 2006.
Second Chinese Office Action dated Jul. 3, 2017, Appln. No. 201510379833.8.
First Chinese Office Action dated Nov. 14, 2016; Appln. No. 201510379833.8.

*Primary Examiner* — Elizabeth A. Bolden
(74) *Attorney, Agent, or Firm* — Ladas & Parry LLP

(57) ABSTRACT

A lead-free sealing glass and a manufacture method thereof are provided. The lead-free sealing glass includes: 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide.

16 Claims, No Drawings

LEAD-FREE SEALING GLASS AND MANUFACTURE METHOD THEREOF

TECHNICAL FILED

Embodiments of the present disclosure relate to a lead-free sealing glass and a manufacture method thereof.

BACKGROUND

Sealing glass is one of common materials for sealing metal, nonmetal or ceramic. At present, a platinum-family sealing glass as utilized in the filed of electronics is capable of sealing metal with nonmetal or ceramic. However, such kind of platinum-family sealing glass has excessively low $T_{k\text{-}100}$ point and poor insulating property, which results in poor high-voltage tolerance and hence cannot satisfy demands of the filed of high-voltage electronics. Moreover, the platinum-family sealing glass contains heavy metal such as lead, which may damage both human health and environment.

To this end, people have been considering to apply lead-free sealing glass into the filed of high-voltage electronics. However, the filed of high-voltage electronics has certain requirements on the voltage tolerance of sealed products, and existing common lead-free sealing glass is relatively poor in voltage tolerance, which results in that the sealed products obtained by sealing with such common lead-free scaling glass cannot be well applied in the filed of high-voltage electronics. Therefore, it's urgently desired to develop a lead-free sealing glass which can be applied in the filed of high-voltage electronics without damaging the human body or the environment.

SUMMARY

The embodiments of the present disclosure provides a lead-free sealing glass comprising 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide.

The embodiments of the present disclosure further provides a manufacture method of lead-free sealing glass, comprising: mixing, melting and cooling 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide to obtain the lead-free sealing glass.

DETAILED DESCRIPTION OF THE PREFERRED EMBODIMENTS

In order to make objects, technical details and advantages of the embodiments of the disclosure apparent, technical solutions according to the embodiments of the present disclosure will be described clearly and completely as below in conjunction with the accompanying drawings of embodiments of the present disclosure. It is to be understood that the described embodiments are only a part of but not all of exemplary embodiments of the present disclosure. Based on the described embodiments of the present disclosure, various other embodiments can be obtained by those of ordinary skill in the art without creative labor and those embodiments shall fall into the protection scope of the present disclosure.

In order to further explain the lead-free sealing glass and the manufacture method thereof as provided by the embodiments of the present disclosure, detailed description will be given as below.

The embodiments of the present disclosure provide a lead-free sealing glass and a manufacture method thereof.

The embodiments of the present disclosure provide technical solutions as below.

A lead-free sealing glass comprising 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide.

The embodiments of the present disclosure further provide a manufacture method of lead-free sealing glass, comprising: mixing, then melting and cooling 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide to obtain the lead-free sealing glass.

The lead-free sealing glass as provided by the embodiments of the present disclosure is added with 2 wt %-10 wt % of $V_2O_5$, which can improve the voltage tolerance of the lead-free sealing glass and allows a temperature $T_{k\text{-}100}$ of equal to or greater than 350° C. for a volume resistivity of $10^8$ Ω·cm. By utilizing such lead-free sealing glass for sealing, the sealed products as obtained will have better voltage tolerance and hence can be applied in the filed of high-voltage electronics. Apart from improving the voltage tolerance of the lead-free sealing glass, the $V_2O_5$ as incorporated can further improve a chemical stability of the lead-free sealing glass. In addition, the lead-free sealing glass as provided by the embodiments of the present disclosure is also added with 30 wt %-60 wt % of $SiO_2$, 5 wt %-10 wt % of CaO, 1 wt %-5 wt % of $Al_2O_3$, 1 wt %-3 wt % of $Fe_2O_3$, and no more than 5 wt % of alkaline earth metal oxide, which are cooperated with $V_2O_5$ to function as improving the chemical stability of the lead-free sealing glass as obtained, for example, improving a water-resistant chemical stability thereof to be of equal to or greater than a second level. The sealed product as obtained by sealing using such lead-free sealing glass, when used in an electronic product, can extend a service life of the electronic product because of the improvement of the chemical stability of the lead-free sealing glass. Moreover, the $Al_2O_3$ and the $Fe_2O_3$ as incorporated in the lead-free sealing glass as provided by the embodiments of the present disclosure can further stabilize a glass former of the lead-free sealing glass within a sealing temperature range so as to prevent from occurrence of crystallization.

In addition, the lead-free sealing glass as provided by the embodiments of the present disclosure uses $SiO_2$ and BaO as the glass former thereof so that it can decrease a softening temperature of the lead-free sealing glass by defining weight percents of $SiO_2$ and BaO, respectively. In order to further adjust the softening temperature of the lead-free sealing glass, the lead-free sealing glass as provided by the embodiments of the present disclosure is further added with 0-5 wt % of $B_2O_3$, through which a softening temperature of 650° C.-750° C. can be achieved. As the glass former of the lead-free sealing glass, the BaO not only serves to adjust the softening temperature but also increases an expansion coefficient of the lead-free sealing glass. Moreover, 1 wt %-5 wt % of $Na_2O$ and 1 wt %-10 wt % of $K_2O$ are also added, which are cooperated with BaO to co-adjust the expansion coefficient of the lead-free sealing glass so as to produce a lead-free sealing glass capable of satisfying requirements of electronic products, that is, a lead-free sealing glass with an expansion coefficient α of $70\times10^{-7}/°$ C.-$110\times10^{-7}/°$ C.

Based on the analysis above, it can be seen that the embodiments of the present disclosure selects chemical constituents for the lead-free sealing glass and allows the chemical constituents to be cooperated with each other for better functions, so that the resulting lead-free sealing glass has good voltage tolerance to satisfy requirements on high-voltage tolerance when used in the filed of high-voltage electronics.

The embodiments of the present disclosure provide a lead-free sealing glass comprising the following chemical constituents: $SiO_2$, BaO, $Na_2O$, $K_2O$, $V_2O_5$, CaO, $Al_2O_3$, $B_2O_3$, $Fe_2O_3$ and alkaline earth metal oxide. Furthermore, the lead-free sealing glass comprises 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide. The sum of the weight percents of all constituents of the lead-free sealing glass is 100 wt %.

The embodiments of the present disclosure optimize the combination of respective chemical constituents in the lead-free sealing glass while controlling the respective weight percents thereof, so as to allow the resulting lead-free sealing glass having better voltage tolerance when used in the filed of high-voltage electrons for reasons as below.

The lead-free sealing glass as provided by the embodiments of the present disclosure is added with 2 wt %-10 wt % of $V_2O_5$, which can improve the voltage tolerance of the lead-free sealing glass and allows a $T_{k-100}$ of equal to or greater than 350° C. for a volume resistivity of $10^8$ Ω·cm. By utilizing such lead-free sealing glass for sealing, the sealed products as obtained will have better voltage tolerance and hence can be applied in the filed of high-voltage electronics. Apart from improving the voltage tolerance of the lead-free sealing glass, the $V_2O_5$ as incorporated can further improve a chemical stability of the lead-free sealing glass. In addition, the lead-free sealing glass as provided by the embodiments of the present disclosure is also added with 30 wt %-60 wt % of $SiO_2$, 5 wt %-10 wt % of CaO, 1 wt %-5 wt % of $Al_2O_3$, 1 wt %-3 wt % of $Fe_2O_3$, and no more than 5 wt % of alkaline earth metal oxide, which are cooperated with $V_2O_5$ to function as improving the chemical stability of the lead-free sealing glass as obtained, for example, improving a water-resistant chemical stability thereof to be of equal to or greater than a second level. The sealed product as obtained by sealing using such lead-free scaling glass, when used in an electronic product, can extend a service life of the electronic product because of the improvement of the chemical stability of the lead-free sealing glass. It should be explained that, in the lead-free sealing glass as provided by the embodiments of the present disclosure, the $V_2O_5$ may not function as described when it's incorporated therein by a weight percent less than 2 wt %, and may be likely to result in a crystallization of the lead-free sealing glass during sealing so as to affect a sealing strength when it's incorporated therein by a weight percent greater than 10 wt %. Moreover, the $Al_2O_3$ and the $Fe_2O_3$ as incorporated in the lead-free sealing glass as provided by the embodiments of the present disclosure can further stabilize a glass former of the lead-free sealing glass within a sealing temperature range so as to prevent from occurrence of crystallization.

In addition, the lead-free sealing glass as provided by the embodiments of the present disclosure uses $SiO_2$ and BaO as the glass former thereof so that it can decrease a softening temperature of the lead-free sealing glass by defining weight percents of $SiO_2$ and BaO, respectively. In order to further adjust the softening temperature of the lead-free sealing glass, the lead-free sealing glass as provided by the embodiments of the present disclosure is further added with 0-5 wt % of $B_2O_3$, through which a softening temperature of 650° C.-750° C. can be achieved. It should be explained that, the lead-free sealing glass as provided by the embodiments of the present disclosure contains 30 wt %-60 wt % of $SiO_2$, because a weight percent of $SiO_2$ less than 30 wt % may result in a difficulty of forming the lead-free sealing glass into glassy state while a weight percent of $SiO_2$ greater than 60 wt % may result in an excessively higher softening temperature of the glass former of the lead-free sealing glass so that the lead-free sealing glass is hard to sufficiently wet the object to be sealed during a high-temperature sealing process and the sealing may be failed consequently.

The lead-fee sealing glass as provided by the embodiments of the present disclosure uses BaO as the glass former so that it not only serves to adjust the softening temperature but also increases an expansion coefficient of the lead-free sealing glass. Moreover, 1 wt %-5 wt % of $Na_2O$ and 1 wt %-10 wt % of $K_2O$ are further added, which are cooperated with BaO to co-adjust the expansion coefficient of the lead-free sealing glass so as to produce a lead-free sealing glass capable of satisfying requirements of electronic products; that is, a lead-free sealing glass with an expansion coefficient of $70\times10^{-7}/°$ C.-$110\times10^{-7}/°$ C. capable of sealing or compressively-sealing with metal, nonmetal or ceramic. Additionally, apart from those functions described above, $Na_2O$, $K_2O$, CaO and alkaline earth metal oxide as incorporated in the lead-free sealing glass as provided by the embodiments of the present disclosure can also decrease a high-temperature viscosity of the lead-free sealing glass and allows the resulting lead-free sealing glass to be clearer.

By mixing the above constituents of the lead-free sealing glass according to the respective weight percents thereof, it can manufacture a lead-free sealing glass satisfying requirements of the filed of high-voltage electronics. In order to optimize a performance of the lead-free sealing glass, the weight percents of the respective constituents in the above-mentioned lead-free sealing glass are further defined in such a manner that the lead-free sealing glass as provided by the embodiments of the present disclosure comprises 40 wt %-50 wt % of $SiO_2$, 15 wt %-25 wt % of BaO, 1.5 wt %-4.5 wt % of $Na_2O$, 4 wt %-9.3 wt % of $K_2O$, 3 wt %-8.7 wt % of $V_2O_5$, 5.5 wt %-9 wt % of CaO, 1.9 wt %-4 wt % of $Al_2O_3$, 2.5-3.7 wt % of $B_2O_3$, 1.7 wt %-2.8 wt % of $Fe_2O_3$, and greater than 0 wt % to less than or equal to 5 wt % of alkaline earth metal oxide. The lead-free sealing glass as manufactured by mixing with such weight percents allows for higher voltage tolerance and better chemical stability.

The present further defines another weight percents for contents of respective constituents in the lead-free sealing glass in such a manner that the lead-free sealing glass as provided by the embodiments of the present disclosure comprises 34 wt %-55.5 wt % of $SiO_2$, 13 wt %-28.9 wt % of BaO, 1.3 wt %-4.8 wt % of $Na_2O$, 3.2 wt %-8.8 wt % of $K_2O$, 4 wt %-8.1 wt % of $V_2O_5$, 5.9 wt %-8.1 wt % of CaO, 1.5 wt %-3.3 wt % of $Al_2O_3$, 1.4 wt %-2.8 wt % of $B_2O_3$, 1.3 wt %-2 wt % of $Fe_2O_3$, and greater than 0 wt % to less than or equal to 5 wt % of alkaline earth metal oxide. The lead-free sealing glass as manufactured by mixing with such weight percents allows for even lower softening temperature and higher expansion coefficient as compared with foregoing lead-free sealing glass.

Various types of alkaline earth metal oxides can be utilized in the lead-free sealing glass as provided by the embodiments of the present disclosure. In an embodiment of the present disclosure, at least one of SrO and MgO is used as the alkaline earth metal oxide at a weight percent of 0-5 wt % and functions for slightly adjusting the high-temperature viscosity and increasing the chemical stability of the lead-free sealing glass.

Tests are conducted on the lead-free sealing glass as provided above for measuring respective performances thereof. By utilizing a test method SJ 689-83 for measuring an expansion coefficient of electro-vacuum glass thread, the expansion coefficient α of the lead-free sealing glass is found to be $70 \times 10^{-7}/°$ C.-$110 \times 10^{-7}/°$ C. By utilizing a test method SJ 690-83 for measuring a softening temperature of electro-vacuum glass, the softening temperature of the lead-free sealing glass is found to be 650° C.-750° C. By utilizing a test method SJ 694-83 for measuring a temperature of electro-vacuum glass given a volume resistivity of $10^8$ Ω·cm, the $T_{k-100}$ of the lead-free sealing glass is found to be of equal to or greater than 350° C. By utilizing a test method SJ 696-83 for measuring a water-resistance chemical stability of electro-vacuum glass, the water-resistance chemical stability of the lead-free sealing glass is found to be equal to or greater than a second level. Many other test methods can be used for measuring the above performances of the lead-free sealing glass, without limiting the present disclosure to those described herein.

The embodiments of the present disclosure further provides a manufacture method of lead-free sealing glass, comprising: mixing, then melting and cooling 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide, so as to obtain the lead-free sealing glass.

In particular implementation, the manufacture method comprises steps as below.

First of all, fully mixing 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide to prepare a mixture.

Then melting the mixture at 1450° C.-1600° C. for 8-15 hours to obtain melt liquid of the mixture.

Finally, cooling and curing the melt liquid of the mixture as obtained to obtain the lead-free sealing glass.

The above-mentioned step of melting the mixture at 1450° C.-1600° C. for 8-15 hours to obtain melt liquid of the mixture can be performed by placing the mixture into a quartz crucible and heating the quartz crucible within an Elema furnace at 1450° C.-1600° C. for 8-15 hours to obtain the melt liquid of the mixture, whereas the present disclosure is not limited thereto.

The lead-free sealing glass as manufactured by the manufacture method of lead-free sealing glass as provided by the embodiments of the present disclosure can bring about the same technical effect with the lead-free sealing glass as described above, and hence details are omitted herein.

Various kinds of alkaline earth metal oxides can be used in the above-mentioned process of preparing the mixture. In an embodiment of the present disclosure, at least one of SrO and MgO is used as the alkaline earth metal oxide at a weight percent of 1-5 wt % in the lead-free sealing glass, and plays the same role in the lead-free sealing glass with those described above without tautology herein.

The lead-free sealing glass as obtained by using above-mentioned manufacture method of lead-free sealing glass can be in different forms such as glass beads and glass slurry or glass paste, according to specific purposes of usage. The embodiments of the present disclosure can be implemented by, but not limited to, drying the lead-free sealing glass as obtained in a founding container; mechanically smashing the lead-free sealing glass; and classifying the mashed lead-free sealing glass to obtain a glass powder as finished product.

Hereinafter the manufacture method of lead-free sealing glass as provided by the embodiments of the present disclosure will be further described in more details. The following embodiments are merely to explain the present disclosure but not to limit the protection scope of the present disclosure thereto. Based on the described embodiments of the present disclosure, various other embodiments can be obtained by those of ordinary skill in the art without creative labor and those embodiments shall fall into the protection scope of the present disclosure.

The First Embodiment

The lead-free sealing glass as provided by the present embodiment comprises $SiO_2$, BaO, $Na_2O$, $K_2O$, $V_2O_5$, CaO, $Al_2O_3$, $B_2O_3$, $Fe_2O_3$, SrO and MgO; wherein, the lead-free sealing glass comprises: 50.9 wt % of $SiO_2$, 21.6 wt % of BaO, 3.5 wt % of $Na_2O$, 3.2 wt % of $K_2O$, 4 wt % of $V_2O_5$, 8.1 wt % of CaO, 2.5 wt % of $Al_2O_3$, 2.8 wt % of $B_2O_3$, 1.4 wt % of $Fe_2O_3$, 1.2 wt % of SrO and 0.8 wt % of MgO.

The manufacture method of the lead-free sealing glass comprises steps as below.

Step 1 weighing $SiO_2$, BaO, $Na_2O$, $K_2O$, $V_2O_5$, CaO, $Al_2O_3$, $B_2O_3$, $Fe_2O_3$, SrO and MgO, respectively; wherein, weighing and fully mixing 50.9 wt % of $SiO_2$, 21.6 wt % of BaO, 3.5 wt % of $Na_2O$, 3.2 wt % of $K_2O$, 4 wt % of $V_2O_5$, 8.1 wt % of CaO, 2.5 wt % of $Al_2O_3$, 2.8 wt % of $B_2O_3$, 1.4 wt % of $Fe_2O_3$, 1.2 wt % of SrO and 0.8 wt % of MgO to prepare a mixture.

Step 2, placing the mixture into a quartz crucible and heating the quartz crucible within an Elema furnace at 1500° C. for 8 hours to obtain melt liquid of the mixture.

Step 3, cooling and curing the melt liquid of the mixture as obtained to obtain a lead-free sealing glass.

By using a test method SJ 689-83 for measuring an expansion coefficient of electro-vacuum glass thread, the expansion coefficient α of the lead-free sealing glass is found to be $86 \times 10^{-7}/°$ C.; by using a test method SJ 690-83 for measuring a softening temperature of electro-vacuum glass, the softening temperature of the lead-free sealing glass is found to be 695° C.; by using a test method SJ 694-83 for measuring a temperature of electro-vacuum glass given a volume resistivity of $10^8$ Ω·cm, the $T_{k-100}$ of the lead-free sealing glass is found to be 380° C.; and by using a test method SJ 696-83 of measuring a water-resistant chemical stability of electro-vacuum glass, the water-resistant chemical stability of the lead-free sealing glass is found to be a first level.

The Second Embodiment

The lead-free sealing glass as provided by the present embodiment comprises $SiO_2$, BaO, $Na_2O$, $K_2O$, $V_2O_5$, CaO, $Al_2O_3$, $B_2O_3$, $Fe_2O_3$, SrO and MgO; wherein, the lead-free sealing glass comprises: 45 wt % of $SiO_2$, 26.2 wt % of BaO, 1.3 wt % of $Na_2O$, 5.8 wt % of $K_2O$, 7.2 wt % of $V_2O_5$, 6 wt % of CaO, 1.5 wt % of $Al_2O_3$, 2 wt % of $B_2O_3$, 1.8 wt % of $Fe_2O_3$, 2.1 wt % of SrO and 1.1 wt % of MgO.

The manufacture method of the lead-free sealing glass comprises steps as below.

Step 1, weighing $SiO_2$, BaO, $Na_2O$, $K_2O$, $V_2O_5$, CaO, $Al_2O_3$, $B_2O_3$, $Fe_2O_3$, SrO and MgO, respectively; wherein, weighing and fully mixing 45 wt % of $SiO_2$, 26.2 wt % of BaO, 1.3 wt % of $Na_2O$, 5.8 wt % of $K_2O$, 7.2 wt % of $V_2O_5$, 6 wt % of CaO, 1.5 wt % of $Al_2O_3$, 2 wt % of $B_2O_3$, 1.8 wt % of $Fe_2O_3$, 2.1 wt % of SrO and 1.1 wt % of MgO to prepare a mixture.

Step 2, placing the mixture into a quartz crucible and heating the quartz crucible within an Elema furnace at 1450° C. for 15 hours to obtain melt liquid of the mixture.

Step 3, cooling and curing the melt liquid of the mixture as obtained to obtain a lead-free sealing glass.

By using a test method SJ 689-83 for measuring an expansion coefficient of electro-vacuum glass thread, the expansion coefficient α of the lead-free sealing glass is found to be $92 \times 10^{-7}$/° C.; by using a test method SJ 690-83 for measuring a softening temperature of electro-vacuum glass, the softening temperature of the lead-free sealing glass is found to be 670° C.; by using a test method SJ 694-83 for measuring a temperature of electro-vacuum glass given a volume resistivity of $10^8$ Ω·cm, the $T_{k-100}$ of the lead-free sealing glass is found to be 365° C.; and by using a test method SJ 696-83 for measuring a water-resistant chemical stability of electro-vacuum glass, the water-resistant chemical stability of the lead-free sealing glass is found to be a second level.

The Third Embodiment

The lead-free sealing glass as provided by the present embodiment comprises $SiO_2$, BaO, $Na_2O$, $K_2O$, $V_2O_5$, CaO, $Al_2O_3$, $B_2O_3$, $Fe_2O_3$, SrO and MgO; wherein, the lead-free sealing glass comprises: 55.5 wt % of $SiO_2$, 13.2 wt % of BaO, 4.5 wt % of $Na_2O$, 6 wt % of $K_2O$, 4.8 wt % of $V_2O_5$, 7.1 wt % of CaO, 2.5 wt % of $Al_2O_3$, 1.4 wt % of $B_2O_3$, 2 wt % of $Fe_2O_3$, 0.9 wt % of SrO and 2.1 wt % of MgO.

The manufacture method of the lead-free sealing glass comprises steps as below.

Step 1, weighing $SiO_2$, BaO, $Na_2O$, $K_2O$, $V_2O_5$, CaO, $Al_2O_3$, $B_2O_3$, $Fe_2O_3$, SrO and MgO, respectively; wherein, weighing and fully mixing 55.5 wt % of $SiO_2$, 13.2 wt % of BaO, 4.5 wt % of $Na_2O$, 6 wt % of $K_2O$, 4.8 wt % of $V_2O_5$, 7.1 wt % of CaO, 2.5 wt % of $Al_2O_3$, 1.4 wt % of $B_2O_3$, 2 wt % of $Fe_2O_3$, 0.9 wt % of SrO and 2.1 wt % of MgO to prepare a mixture.

Step 2, placing the mixture into a quartz crucible and heating the quartz crucible within an Elema furnace at 1550° C. for 9 hours to obtain melt liquid of the mixture.

Step 3, cooling and curing the melt liquid of the mixture as obtained to obtain a lead-free sealing glass.

By using a test method SJ 689-83 for measuring an expansion coefficient of electro-vacuum glass thread, the expansion coefficient α of the lead-free sealing glass is found to be $75 \times 10^{-7}$/° C.; by using a test method SJ 690-83 for measuring a softening temperature of electro-vacuum glass, the softening temperature of the lead-free sealing glass is found to be 710° C.; by using a test method SJ 694-83 for measuring a temperature of electro-vacuum glass given a volume resistivity of $10^8$ Ω·cm, the $T_{k-100}$ of the lead-free sealing glass is found to be 382° C.; and by using a test method SJ 696-83 for measuring a water-resistant chemical stability of electro-vacuum glass, the water-resistant chemical stability of the lead-free sealing glass is found to be a first level.

The Fourth Embodiment

The lead-free sealing glass as provided by the present embodiment comprises $SiO_2$, BaO, $Na_2O$, $K_2O$, $V_2O_5$, CaO, $Al_2O_3$, $B_2O_3$, $Fe_2O_3$, SrO and MgO; wherein, the lead-free sealing glass comprises: 34 wt % of $SiO_2$, 28.9 wt % of BaO, 4.8 wt % of $Na_2O$, 8.8 wt % of $K_2O$, 8.1 wt % of $V_2O_5$, 5.9 wt % of CaO, 3.3 wt % of $Al_2O_3$, 2.6 wt % of $B_2O_3$, 1.3 wt % of $Fe_2O_3$, 1.8 wt % of SrO and 0.5 wt % of MgO.

The manufacture method of the lead-free sealing glass comprises steps as below.

Step 1, weighing $SiO_2$, BaO, $Na_2O$, $K_2O$, $V_2O_5$, CaO, $Al_2O_3$, $B_2O_3$, $Fe_2O_3$, SrO and MgO, respectively; wherein, weighing and fully mixing 34 wt % of $SiO_2$, 28.9 wt % of BaO, 4.8 wt % of $Na_2O$, 8.8 wt % of $K_2O$, 8.1 wt % of $V_2O_5$, 5.9 wt % of CaO, 3.3 wt % of $Al_2O_3$, 2.6 wt % of $B_2O_3$, 1.3 wt % of $Fe_2O_3$, 1.8 wt % of SrO and 0.5 wt % of MgO to prepare a mixture.

Step 2, placing the mixture into a quartz crucible and heating the quartz crucible within an Elema furnace at 1600° C. for 8 hours to obtain melt liquid of the mixture.

Step 3, cooling and curing the melt liquid of the mixture as obtained to obtain a lead-free sealing glass.

By using a test method SJ 689-83 for measuring an expansion coefficient of electro-vacuum glass thread, the expansion coefficient α of the lead-free sealing glass is found to be $97 \times 10^{-7}$/° C.; by using a test method SJ 690-83 for measuring a softening temperature of electro-vacuum glass, the softening temperature of the lead-free sealing glass is found to be 665° C.; by using a test method SJ 694-83 for measuring a temperature of electro-vacuum glass given a volume resistivity of $10^8$ Ω·cm, the $T_{k-100}$ of the lead-free sealing glass is found to be 370° C.; and by using a test method SJ 696-83 for measuring a water-resistant chemical stability of electro-vacuum glass, the water-resistant chemical stability of the lead-free sealing glass is found to be a second level.

The Fifth Embodiment

The lead-free sealing glass as provided by the present embodiment comprises $SiO_2$, BaO, $Na_2O$, $K_2O$, $V_2O_5$, CaO, $Al_2O_3$, $B_2O_3$, $Fe_2O_3$ and SrO; wherein, the lead-free sealing glass comprises: 41 wt % of $SiO_2$, 25.3 wt % of BaO, 4.6 wt % of $Na_2O$, 7.5 wt % of $K_2O$, 7.2 wt % of $V_2O_5$, 6.5 wt % of CaO, 3 wt % of $Al_2O_3$, 2.1 wt % of $B_2O_3$, 1.5 wt % of $Fe_2O_3$ and 1.3 wt % of SrO.

The manufacture method of the lead-free sealing glass comprises steps as below.

Step 1, weighing $SiO_2$, BaO, $Na_2O$, $K_2O$, $V_2O_5$, CaO, $Al_2O_3$, $B_2O_3$, $Fe_2O_3$ and SrO, respectively; wherein, weighing and fully mixing 41 wt % of $SiO_2$, 25.3 wt % of BaO, 4.6 wt % of $Na_2O$, 7.5 wt % of $K_2O$, 7.2 wt % of $V_2O_5$, 6.5 wt % of CaO, 3 wt % of $Al_2O_3$, 2.1 wt % of $B_2O_3$, 1.5 wt % of $Fe_2O_3$ and 1.3 wt % of SrO to prepare a mixture.

Step 2, placing the mixture into a quartz crucible and heating the quartz crucible within an Elema furnace at 1550° C. for 9 hours to obtain melt liquid of the mixture.

Step 3, cooling and curing the melt liquid of the mixture as obtained to obtain a lead-free sealing glass.

By using a test method SJ 689-83 for measuring an expansion coefficient of electro-vacuum glass thread, the expansion coefficient α of the lead-free sealing glass is found to be $99 \times 10^{-7}/°C$.; by using a test method SJ 690-83 for measuring a softening temperature of electro-vacuum glass, the softening temperature of the lead-free sealing glass is found to be 661° C.; by using a test method SJ 694-83 for measuring a temperature of electro-vacuum glass given a volume resistivity of $10^8$ Ω·cm, the $T_{k-100}$ of the lead-free sealing glass is found to be 385° C.; and by using a test method SJ 696-83 for measuring a water-resistant chemical stability of electro-vacuum glass, the water-resistant chemical stability of the lead-free sealing glass is found to be a first level.

The Sixth Embodiment

The lead-free sealing glass as provided by the present embodiment comprises $SiO_2$, BaO, $Na_2O$, $K_2O$, $V_2O_5$, CaO, $Al_2O_3$, $B_2O_3$ and $Fe_2O_3$; wherein, the lead-free sealing glass comprises: 47 wt % of $SiO_2$, 19.3 wt % of BaO, 3.6 wt % of $Na_2O$, 8.4 wt % of $K_2O$, 7.3 wt % of $V_2O_5$, 5.4 wt % of CaO, 4.1 wt % of $Al_2O_3$, 3.1 wt % of $B_2O_3$ and 1.8 wt % of $Fe_2O_3$.

The manufacture method of the lead-free sealing glass comprises steps as below.

Step 1, weighing $SiO_2$, BaO, $Na_2O$, $K_2O$, $V_2O_5$, CaO, $Al_2O_3$, $B_2O_3$ and $Fe_2O_3$, respectively; wherein, weighing and fully mixing 47 wt % of $SiO_2$, 19.3 wt % of BaO, 3.6 wt % of $Na_2O$, 8.4 wt % of $K_2O$, 7.3 wt % of $V_2O_5$, 5.4 wt % of CaO, 4.1 wt % of $Al_2O_3$, 3.1 wt % of $B_2O_3$ and 1.8 wt % of $Fe_2O_3$ to prepare a mixture.

Step 2, placing the mixture into a quartz crucible and heating the quartz crucible within an Elema furnace at 1450° C. for 12 hours to obtain melt liquid of the mixture.

Step 3, cooling and curing the melt liquid of the mixture as obtained to obtain a lead-free sealing glass.

By using a test method SJ 689-83 for measuring an expansion coefficient of electro-vacuum glass thread, the expansion coefficient α of the lead-free sealing glass is found to be $95 \times 10^{-7}/°C$.; by using a test method SJ 690-83 for measuring a softening temperature of electro-vacuum glass, the softening temperature of the lead-free sealing glass is found to be 669° C.; by using a test method SJ 694-83 for measuring a temperature of electro-vacuum glass given a volume resistivity of $10^8$ Ω·cm, the $T_{k-100}$ of the lead-free sealing glass is found to be 388° C.; and by using a test method SJ 696-83 for measuring a water-resistant chemical stability of electro-vacuum glass, the water-resistant chemical stability of the lead-free sealing glass is found to be a first level.

The present disclosure comprises embodiments as below.

Embodiment 1

A lead-free sealing glass, comprising: 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0 wt %-5 wt % of alkaline earth metal oxide.

Embodiment 2

The lead-free sealing glass according to embodiment 1, comprising: 40 wt %-50 wt % of $SiO_2$, 15 wt %-25 wt % of BaO, 1.5 wt %-4.5 wt % of $Na_2O$, 4 wt %-9.3 wt % of $K_2O$, 3 wt %-8.7 wt % of $V_2O_5$, 5.5 wt %-9 wt % of CaO, 1.9 wt %-4 wt % of $Al_2O_3$, 2.5-3.7 wt % of $B_2O_3$, 1.7 wt %-2.8 wt % of $Fe_2O_3$, and greater than 0 wt % to less than or equal to 5 wt % of alkaline earth metal oxide.

Embodiment 3

The lead-free sealing glass according to embodiment 1, comprising: 34 wt %-55.5 wt % of $SiO_2$, 13 wt %-28.9 wt % of BaO, 1.3 wt %-4.8 wt % of $Na_2O$, 3.2 wt %-8.8 wt % of $K_2O$, 4 wt %-8.1 wt % of $V_2O_5$, 5.9 wt %-8.1 wt % of CaO, 1.5 wt %-3.3 wt % of $Al_2O_3$, 1.4 wt %-2.8 wt % of $B_2O_3$, 1.3 wt %-2 wt % of $Fe_2O_3$, and greater than 0 wt % to less than or equal to 5 wt % of alkaline earth metal oxide.

Embodiment 4

The lead-free sealing glass according to embodiment 1, wherein the alkaline earth metal oxide comprises at least one selected from the group consisting of SrO and MgO.

Embodiment 5

The lead-free sealing glass according to embodiment 2, wherein the alkaline earth metal oxide comprises at least one selected from the group consisting of SrO and MgO.

Embodiment 6

The lead-free sealing glass according to embodiment 3, wherein the alkaline earth metal oxide comprises at least one selected from the group consisting of SrO and MgO.

Embodiment 7

The lead-free sealing glass according to embodiment 1, wherein the lead-free sealing glass has a softening temperature of 650° C.-750° C., an expansion coefficient α of $70 \times 10^{-7}/°C$.-$110 \times 10^{-7}/°C$., a temperature $T_{k-100}$ of equal to or greater than 350° C. given a volume resistivity of $10^8$ Ω·cm, and a water-resistant chemical stability of equal to or greater than a second level.

Embodiment 8

The lead-free sealing glass according to embodiment 1, comprising: 50.9 wt %-55.5 wt % of $SiO_2$, 13.2 wt %-21.6 wt % of BaO, 3.5 wt %-4.5 wt % of $Na_2O$, 3.2 wt %-6 wt % of $K_2O$, 4 wt %-4.8 wt % of $V_2O_5$, 7.1 wt %-8.1 wt % of CaO, 2.5 wt %-5 wt % of $Al_2O_3$, 1.4 wt %-2.8 wt % of $B_2O_3$, 1.4 wt %-2 wt % of $Fe_2O_3$, 0.9 wt %-1.2 wt % of SrO, and 0.8 wt %-2.1 wt % of MgO.

Embodiment 9

The lead-free sealing glass according to embodiment 1, comprising: 34 wt %-45 wt % of $SiO_2$, 26.2 wt %-28.9 wt % of BaO, 1.3 wt %-4.8 wt % of $Na_2O$, 5.8 wt %-8.8 wt % of $K_2O$, 7.2 wt %-8.1 wt % of $V_2O_5$, 5.9 wt %-6 wt % of CaO, 1.5 wt %-3.3 wt % of $Al_2O_3$, 2 wt %-2.6 wt % of $B_2O_3$, 1.3 wt %-1.8 wt % of $Fe_2O_3$, 1.8 wt %-2.1 wt % of SrO, and 0.5 wt %-1.1 wt % of MgO.

Embodiment 10

The lead-free sealing glass according to embodiment 1, comprising: 41 wt % of $SiO_2$, 25.3 wt % of BaO, 4.6 wt % of $Na_2O$, 7.5 wt % of $K_2O$, 7.2 wt % of $V_2O_5$, 6.5 wt % of CaO, 3 wt % of $Al_2O_3$, 2.1 wt % of $B_2O_3$, 1.5 wt % of $Fe_2O_3$ and 1.3 wt % of SrO.

Embodiment 11

The lead-free sealing glass according to embodiment 1, comprising: 47 wt % of $SiO_2$, 19.3 wt % of BaO, 3.6 wt % of $Na_2O$, 8.4 wt % of $K_2O$, 7.3 wt % of $V_2O_5$, 5.4 wt % of CaO, 4.1 wt % of $Al_2O_3$, 3.1 wt % of $B_2O_3$ and 1.8 wt % of $Fe_2O_3$.

Embodiment 12

A manufacture method of a lead-free sealing glass, comprising: mixing, melting and cooling 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide to obtain the lead-free sealing glass.

Embodiment 13

The manufacture method of lead-free sealing glass according to embodiment 12, wherein the alkaline earth metal oxide comprises at least one selected from the group consisting of SrO and MgO.

Embodiment 14

The manufacture method of lead-free sealing glass according to embodiment 12, wherein the melting is performed at 1450° C.-1600° C., and the melting is performed for 8 h-15 h.

Embodiment 15

The manufacture method of lead-free sealing glass according to embodiment 12, comprising: mixing, melting and cooling 40 wt %-50 wt % of $SiO_2$, 15 wt %-25 wt % of BaO, 1.5 wt %-4.5 wt % of $Na_2O$, 4 wt %-9.3 wt % of $K_2O$, 3 wt %-8.7 wt % of $V_2O_5$, 5.5 wt %-9 wt % of CaO, 1.9 wt %-4 wt % of $Al_2O_3$, 2.5-3.7 wt % of $B_2O_3$, 1.7 wt %-2.8 wt % of $Fe_2O_3$, and greater than 0 wt %-5 wt % of alkaline earth metal oxide to obtain the lead-free sealing glass.

Embodiment 16

The manufacture method of lead-free sealing glass according to embodiment 12, comprising: mixing, melting and cooling 34 wt %-55.5 wt % of $SiO_2$, 13 wt %-28.9 wt % of BaO, 1.3 wt %-4.8 wt % of $Na_2O$, 3.2 wt %-8.8 wt % of $K_2O$, 4 wt %-8.1 wt % of $V_2O_5$, 5.9 wt %-8.1 wt % of CaO, 1.5 wt %-3.3 wt % of $Al_2O_3$, 1.4-2.8 wt % of $B_2O_3$, 1.3 wt %-2 wt % of $Fe_2O_3$, and greater than 0 wt %-5 wt % of alkaline earth metal oxide to obtain the lead-free sealing glass.

Embodiment 17

The manufacture method of lead-free sealing glass according to embodiment 12, comprising: mixing, melting and cooling 50.9 wt %-55.5 wt % of $SiO_2$, 13.2 wt %-21.6 wt % of BaO, 3.5 wt %-4.5 wt % of $Na_2O$, 3.2 wt %-6 wt % of $K_2O$, 4 wt %-4.8 wt % of $V_2O_5$, 7.1 wt %-8.1 wt % of CaO, 2.5 wt %-5 wt % of $Al_2O_3$, 1.4 wt %-2.8 wt % of $B_2O_3$, 1.4 wt %-2 wt % of $Fe_2O_3$, 0.9 wt %-1.2 wt % of SrO, and 0.8 wt %-2.1 wt % of MgO to obtain the lead-free sealing glass.

Embodiment 18

The manufacture method of lead-free sealing glass according to embodiment 12, comprising: mixing, melting and cooling 34 wt %-45 wt % of $SiO_2$, 26.2 wt %-28.9 wt % of BaO, 1.3 wt %-4.8 wt % of $Na_2O$, 5.8 wt %-8.8 wt % of $K_2O$, 7.2 wt %-8.1 wt % of $V_2O_5$, 5.9 wt %-6 wt % of CaO, 1.5 wt %-3.3 wt % of $Al_2O_3$, 2 wt %-2.6 wt % of $B_2O_3$, 1.3 wt %-1.8 wt % of $Fe_2O_3$, 1.8 wt %-2.1 wt % of SrO, and 0.5 wt %-1.1 wt % of MgO to obtain the lead-free sealing glass.

Embodiment 19

The manufacture method of lead-free sealing glass according to embodiment 12, comprising: mixing, melting and cooling 41 wt % of $SiO_2$, 25.3 wt % of BaO, 4.6 wt % of $Na_2O$, 7.5 wt % of $K_2O$, 7.2 wt % of $V_2O_5$, 6.5 wt % of CaO, 3 wt % of $Al_2O_3$, 2.1 wt % of $B_2O_3$, 1.5 wt % of $Fe_2O_3$ and 1.3 wt % of SrO to obtain the lead-free sealing glass.

Embodiment 20

The manufacture method of lead-free sealing glass according to embodiment 12, comprising: mixing, melting and cooling 47 wt % of $SiO_2$, 19.3 wt % of BaO, 3.6 wt % of $Na_2O$, 8.4 wt % of $K_2O$, 7.3 wt % of $V_2O_5$, 5.4 wt % of CaO, 4.1 wt % of $Al_2O_3$, 3.1 wt % of $B_2O_3$ and 1.8 wt % of $Fe_2O_3$ to obtain the lead-free sealing glass.

The described above are just exemplary embodiments of the present disclosure and the invention is not intended to be limited thereto. The scope of the present disclosure shall be defined by the appended claims.

The present application claims the priority of China patent application No. 201510379833.8 filed on Jul. 1, 2015, which is incorporated herein by reference in its entirely.

What is claimed is:

1. A lead-free sealing glass, comprising: 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0 wt %-5 wt % of alkaline earth metal oxide selected from the group consisting of SrO and MgO.

2. The lead-free sealing glass according to claim 1, comprising: 40 wt %-50 wt % of $SiO_2$, 15 wt %-25 wt % of BaO, 1.5 wt %-4.5 wt % of $Na_2O$, 4 wt %-9.3 wt % of $K_2O$, 3 wt %-8.7 wt % of $V_2O_5$, 5.5 wt %-9 wt % of CaO, 1.9 wt %-4 wt % of $Al_2O_3$, 2.5-3.7 wt % of $B_2O_3$, 1.7 wt %-2.8 wt % of $Fe_2O_3$, and greater than 0 wt % to less than or equal to 5 wt % of alkaline earth metal oxide selected from the group consisting of SrO and MgO.

3. The lead-free sealing glass according to claim 1, comprising: 34 wt %-55.5 wt % of $SiO_2$, 13 wt %-28.9 wt % of BaO, 1.3 wt %-4.8 wt % of $Na_2O$, 3.2 wt %-8.8 wt % of $K_2O$, 4 wt %-8.1 wt % of $V_2O_5$, 5.9 wt %-8.1 wt % of CaO, 1.5 wt %-3.3 wt % of $Al_2O_3$, 1.4 wt %-2.8 wt % of $B_2O_3$, 1.3 wt %-2 wt % of $Fe_2O_3$, and greater than 0 wt % to less than or equal to 5 wt % of alkaline earth metal oxide selected from the group consisting of SrO and MgO.

4. The lead-free sealing glass according to claim 1, comprising: 50.9 wt %-55.5 wt % of $SiO_2$, 13.2 wt %-21.6 wt % of BaO, 3.5 wt %-4.5 wt % of $Na_2O$, 3.2 wt %-6 wt % of $K_2O$, 4 wt %-4.8 wt % of $V_2O_5$, 7.1 wt %-8.1 wt % of CaO, 2.5 wt %-5 wt % of $Al_2O_3$, 1.4 wt %-2.8 wt % of $B_2O_3$, 1.4 wt %-2 wt % of $Fe_2O_3$, 0.9 wt %-1.2 wt % of SrO, and 0.8 wt %-2.1 wt % of MgO.

5. The lead-free sealing glass according to claim 1, comprising: 34 wt %-45 wt % of $SiO_2$, 26.2 wt %-28.9 wt % of BaO, 1.3 wt %-4.8 wt % of $Na_2O$, 5.8 wt %-8.8 wt % of $K_2O$, 7.2 wt %-8.1 wt % of $V_2O_5$, 5.9 wt %-6 wt % of CaO, 1.5 wt %-3.3 wt % of $Al_2O_3$, 2 wt %-2.6 wt % of $B_2O_3$, 1.3 wt %-1.8 wt % of $Fe_2O_3$, 1.8 wt %-2.1 wt % of SrO, and 0.5 wt %-1.1 wt % of MgO.

6. The lead-free sealing glass according to claim 1, comprising: 41 wt % of $SiO_2$, 25.3 wt % of BaO, 4.6 wt % of $Na_2O$, 7.5 wt % of $K_2O$, 7.2 wt % of $V_2O_5$, 6.5 wt % of CaO, 3 wt % of $Al_2O_3$, 2.1 wt % of $B_2O_3$, 1.5 wt % of $Fe_2O_3$ and 1.3 wt % of SrO.

7. The lead-free sealing glass according to claim 1, comprising: 47 wt % of $SiO_2$, 19.3 wt % of BaO, 3.6 wt % of $Na_2O$, 8.4 wt % of $K_2O$, 7.3 wt % of $V_2O_5$, 5.4 wt % of CaO, 4.1 wt % of $Al_2O_3$, 3.1 wt % of $B_2O_3$ and 1.8 wt % of $Fe_2O_3$.

8. The lead-free sealing glass according to claim 1, wherein the lead-free sealing glass has a softening temperature of 650° C.-750° C., an expansion coefficient α of $70\times10^{-7}$/° C.-$110\times10^{-7}$/° C., a temperature $T_{k-100}$ of equal to or greater than 350° C. given a volume resistivity of $10^8$ Ω·cm, and a water-resistant chemical stability of equal to or greater than a second level.

9. A manufacture method of a lead-free sealing glass, comprising: mixing, melting and cooling 30 wt %-60 wt % of $SiO_2$, 10 wt %-30 wt % of BaO, 1 wt %-5 wt % of $Na_2O$, 1 wt %-10 wt % of $K_2O$, 2 wt %-10 wt % of $V_2O_5$, 5 wt %-10 wt % of CaO, 1 wt %-5 wt % of $Al_2O_3$, 0 wt %-5 wt % of $B_2O_3$, 1 wt %-3 wt % of $Fe_2O_3$, and 0-5 wt % of alkaline earth metal oxide selected from the group consisting of SrO and MgO to obtain the lead-free sealing glass.

10. The manufacture method of lead-free sealing glass according to claim 9, comprising: mixing, melting and cooling 40 wt %-50 wt % of $SiO_2$, 15 wt %-25 wt % of BaO, 1.5 wt %-4.5 wt % of $Na_2O$, 4 wt %-9.3 wt % of $K_2O$, 3 wt %-8.7 wt % of $V_2O_5$, 5.5 wt %-9 wt % of CaO, 1.9 wt %-4 wt % of $Al_2O_3$, 2.5-3.7 wt % of $B_2O_3$, 1.7 wt %-2.8 wt % of $Fe_2O_3$, and greater than 0 wt %-5 wt % of alkaline earth metal oxide selected from the group consisting of SrO and MgO to obtain the lead-free sealing glass.

11. The manufacture method of lead-free sealing glass according to claim 9, comprising: mixing, melting and cooling 34 wt %-55.5 wt % of $SiO_2$, 13 wt %-28.9 wt % of BaO, 1.3 wt %-4.8 wt % of $Na_2O$, 3.2 wt %-8.8 wt % of $K_2O$, 4 wt %-8.1 wt % of $V_2O_5$, 5.9 wt %-8.1 wt % of CaO, 1.5 wt %-3.3 wt % of $Al_2O_3$, 1.4-2.8 wt % of $B_2O_3$, 1.3 wt %-2 wt % of $Fe_2O_3$, and greater than 0 wt %-5 wt % of alkaline earth metal oxide selected from the group consisting of SrO and MgO to obtain the lead-free sealing glass.

12. The manufacture method of lead-free sealing glass according to claim 9, comprising: mixing, melting and cooling 50.9 wt %-55.5 wt % of $SiO_2$, 13.2 wt %-21.6 wt % of BaO, 3.5 wt %-4.5 wt % of $Na_2O$, 3.2 wt %-6 wt % of $K_2O$, 4 wt %-4.8 wt % of $V_2O_5$, 7.1 wt %-8.1 wt % of CaO, 2.5 wt %-5 wt % of $Al_2O_3$, 1.4 wt %-2.8 wt % of $B_2O_3$, 1.4 wt %-2 wt % of $Fe_2O_3$, 0.9 wt %-1.2 wt % of SrO, and 0.8 wt %-2.1 wt % of MgO to obtain the lead-free sealing glass.

13. The manufacture method of lead-free sealing glass according to claim 9, comprising: mixing, melting and cooling 34 wt %-45 wt % of $SiO_2$, 26.2 wt %-28.9 wt % of BaO, 1.3 wt %-4.8 wt % of $Na_2O$, 5.8 wt %-8.8 wt % of $K_2O$, 7.2 wt %-8.1 wt % of $V_2O_5$, 5.9 wt %-6 wt % of CaO, 1.5 wt %-3.3 wt % of $Al_2O_3$, 2 wt %-2.6 wt % of $B_2O_3$, 1.3 wt %-1.8 wt % of $Fe_2O_3$, 1.8 wt %-2.1 wt % of SrO, and 0.5 wt %-1.1 wt % of MgO to obtain the lead-free sealing glass.

14. The manufacture method of lead-free sealing glass according to claim 9, comprising: mixing, melting and cooling 41 wt % of SiO2, 25.3 wt % of BaO, 4.6 wt % of $Na_2O$, 7.5 wt % of $K_2O$, 7.2 wt % of $V_2O_5$, 6.5 wt % of CaO, 3 wt % of $Al_2O_3$, 2.1 wt % of $B_2O_3$, 1.5 wt % of $Fe_2O_3$ and 1.3 wt % of SrO to obtain the lead-free sealing glass.

15. The manufacture method of lead-free sealing glass according to claim 9, comprising: mixing, melting and cooling 47 wt % of SiO2, 19.3 wt % of BaO, 3.6 wt % of $Na_2O$, 8.4 wt % of $K_2O$, 7.3 wt % of $V_2O_5$, 5.4 wt % of CaO, 4.1 wt % of $Al_2O_3$, 3.1 wt % of $B_2O_3$ and 1.8 wt % of $Fe_2O_3$ to obtain the lead-free sealing glass.

16. The manufacture method of lead-free sealing glass according to claim 9, wherein the melting is performed at 1450° C.-1600° C., and the melting is performed for 8 h-15 h.

* * * * *